United States Patent [19]

Hall et al.

[11] Patent Number: 4,648,762

[45] Date of Patent: Mar. 10, 1987

[54] APPARATUS FOR PREPARING THE EDGES OF METAL SHEETS TO BE WELDED

[76] Inventors: Sture Hall, Runemo 4231, S-82200 Alfta; Bertil Persson, Vretvägen 6C, S-80239 Gävle, both of Sweden

[21] Appl. No.: 625,352

[22] Filed: Jun. 27, 1984

[30] Foreign Application Priority Data

Jul. 1, 1983 [SE] Sweden ............................. 8303779

[51] Int. Cl.[4] ............................................ B23C 3/12
[52] U.S. Cl. .................. 409/138; 144/246 B; 409/303
[58] Field of Search ................. 409/138, 303; 144/242 C, 246 R, 246 B, 246 G; 51/39, 66, 78, 87

[56] References Cited

U.S. PATENT DOCUMENTS

| 1,277,891 | 9/1918 | Evans | 409/138 |
|---|---|---|---|
| 2,238,434 | 4/1941 | Oberhoffken | 409/138 |
| 3,125,934 | 3/1964 | Persson | 409/138 |
| 3,557,658 | 1/1971 | Jamison | 409/138 |
| 3,880,036 | 4/1975 | Yokoyama | 144/246 B X |
| 4,018,134 | 4/1977 | Linsinger | 409/138 |

FOREIGN PATENT DOCUMENTS

| 532577 | 8/1931 | Fed. Rep. of Germany | 144/246 B |
|---|---|---|---|
| 715780 | 12/1941 | Fed. Rep. of Germany | |
| 170283 | 2/1960 | Sweden | |
| 368916 | 7/1974 | Sweden | |
| 423191 | 4/1982 | Sweden | |
| 780635 | 8/1957 | United Kingdom | 144/246 B |

*Primary Examiner*—Gil Weidenfeld
*Assistant Examiner*—Steven C. Bishop
*Attorney, Agent, or Firm*—Spencer & Frank

[57] ABSTRACT

An apparatus for preparing the edges of metal sheets to be welded comprises one or more metal working means, particularly milling cutters, included in a unit which is associated with means for producing between the sheet and the unit a relative movement during which the metal working means are working an edge of the sheet. The means for producing said relative movement comprise two sets each including at least three rotatable rollers which can be pressed against opposite sides of the sheet and of which two rollers engaging the same side of the sheet are spaced apart in the direction of movement in order, together with the roller or rollers engaging the opposite side of the sheet, to safely hold the sheet also when said metal working means have passed the end of the sheet edge being worked.

9 Claims, 6 Drawing Figures

APPARATUS FOR PREPARING THE EDGES OF METAL SHEETS TO BE WELDED

BACKGROUND OF THE INVENTION

This invention relates to an apparatus for preparing the edges of metal sheets to be welded, comprising an assembly of metal working means, in particular milling cutters, included in a unit which is associated with means for producing between the sheet and the unit a relative movement during which said metal working means are working an edge of the sheet.

Swedish patent specification No. 170,283 describes an edge preparation apparatus of the above-indicated general type comprising a metal working unit which is movable along the upper edge of a substantially vertically positioned sheet and which, as metal working means, includes an assembly of milling cutters suited both for face milling and for bevelling said edge. This working unit is in the form of a carriage divided into two parts, viz. a first part which is provided with wheels and is movable along a rectilinear guide by means of a chain drive, and a second part which supports the milling cutters and is vertically displaceable with respect to the first part to adjust the apparatus to sheets of different width. The sheet subjected to machining is carried at its lower edge by a roller bed including a plurality of lying supporting rollers and a plurality of standing guide wheels against which one side of the sheet bears. In the area of its upper edge, the sheet, in its upright position, is maintained by a pair of supporting wheels which are mounted on and accompany the movable carriage. The purpose of this construction is to permit the sheet, under the influence of any curved portions or sinuosities that may exist in the sheet, to pivot its lower edge, with the supporting wheels constituting a centre of oscillation, according as the curved portions during the travel of the carriage along the edge of the sheet being machined, enter into engagement with the milling cutters.

The above-described apparatus may possibly be capable of working relatively thin and light sheets in an acceptable way. However, for thick and heavy sheets (e.g. up to 22×4.5 m and with a thickness of 30–40 mm), it is useless in actual practice. For sheets weighing some tens of tons, the sheet is simply unable to oscillate with its lower edge in the intended way, which means that the sheet will have a bending effect on the milling and carriage equipment. Another shortcoming of the known apparatus is that the sheets must necessarily be held in an upright position. This means that the sheets, in a complicated and time-consuming way, must be turned after a first edge has been finally machined and before the opposite edge should be worked. Further, this prior art apparatus suffers from a poor machining capacity since only one edge can be worked in each machining operation in that the lower edge of the sheet must always be resting on the roller bed and, hence, is not accessible for milling.

Swedish published application No. 368,916 describes an apparatus for simultaneously milling the surfaces of two edges, facing each other, of two adjacent sheets. In this known apparatus, the sheets are clamped fast by means of electromagnets, and a carriage which at its upper end carries a milling body is advanced along a rail located on a level below the sheets. This apparatus has no drive rollers at all that can follow the edge portions of the sheets and possible sinuosities thereon. Thus, this apparatus is suited exclusively for milling the faces of the sheet edges, but not for bevelling them.

Nor has the apparatus disclosed in Swedish published application No. 7514613-4 any drive rollers that can follow the edge of the sheet. On the contrary, the metal working unit employed is advanced along a guiding device disposed beside the sheet.

Federal Republic of Germany patent specification No. 715780 discloses an apparatus for bevelling pipe ends. However, this apparatus has only one set of rollers and, therefore, is not capable of maintaining the apparatus with respect to a straight, lying sheet once the metal working means have passed the end of the sheet. Further, the oblique grooves provided on the drive rollers of the known apparatus do not in actual practice efficiently approach the metal working means and the pipe end to each other.

SUMMARY OF THE INVENTION

The present invention aims at overcoming the above-mentioned drawbacks and at providing a simple and inexpensive edge preparing apparatus for efficiently working both very thin and very thick metal sheets without the need of complicated turning and readjusting operations. Particularly, the apparatus should be capable of machining the edges of lying thick sheets. According to the invention, these and other objects are achieved by an apparatus which is characterised in that there is provided on either side of said assembly of metal working means a set of at least three rotatable rollers which can be pressed against opposite sides of a suitably lying sheet and of which two rollers engaging the same side of the sheet are spaced from each other in the direction of movement in order, together with the roller or rollers engaging the opposite side of the sheet, to safely hold the sheet also when said metal working means have passed the end of the sheet edge being worked, and that one or more driven rollers of each set of rollers are positioned at an angle or angularly positionable in relation to the direction of movement in order during machining of the sheet to impart to it not only a longitudinal component force which brings about said relative movement between the sheet and the unit, but also a transverse component force which automatically constantly tends to urge the edge of the sheet and said metal working means against each other.

In that the metal working unit produces the required relative movement with respect to the sheet by means of drive rollers of its own which can be pressed against the sheet and maintained in a powerful frictional engagement therewith, the unit and its milling cutters may easily follow the edge of the sheet also when the plane of the sheet is more or less curved, while ensuring that the milling cutters, also for very thick and curved sheets, will always produce appropriate bevelled surfaces of a uniform width on the edge machined.

DESCRIPTION OF THE PREFERRED EMBODIMENTS

Figure 1:
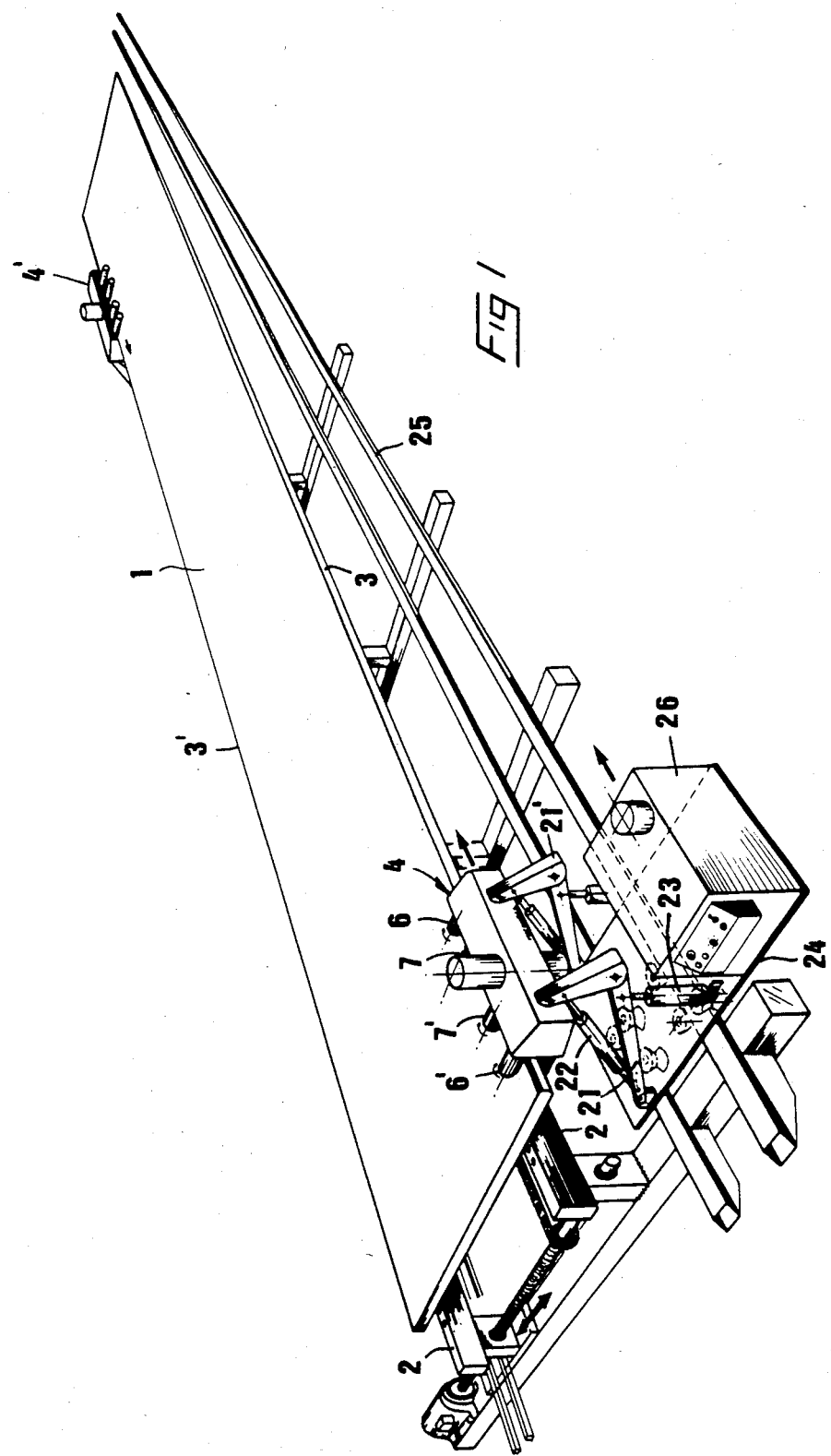
FIG. 1 is a perspective view showing an installation including two apparatuses according to the invention.

In FIG. 1, 1 designates an elongate metal sheet of uniform width which is placed in a horizontal position on a table, also elongate, which consists of two beams 2, 2' one of which is advantageously stationary whereas the other is movable to and from the first beam in order to permit placing sheets of different width. In the illustrated Figure, the two opposite edges 3, 3' of the long sides of the sheet 1 are subjected to a bevelling or machining operation by means of two apparatuses 4, 4' according to the invention.

Figure 2:
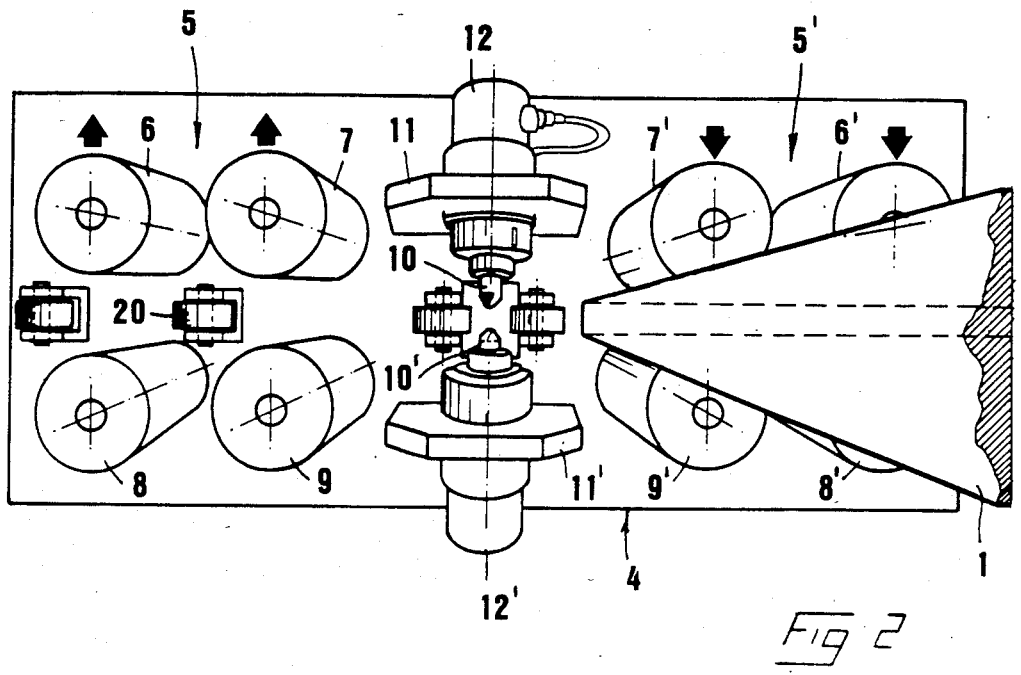
FIG. 2 is a highly schematic perspective view showing the apparatus of the invention on a larger scale.
Figure 3:
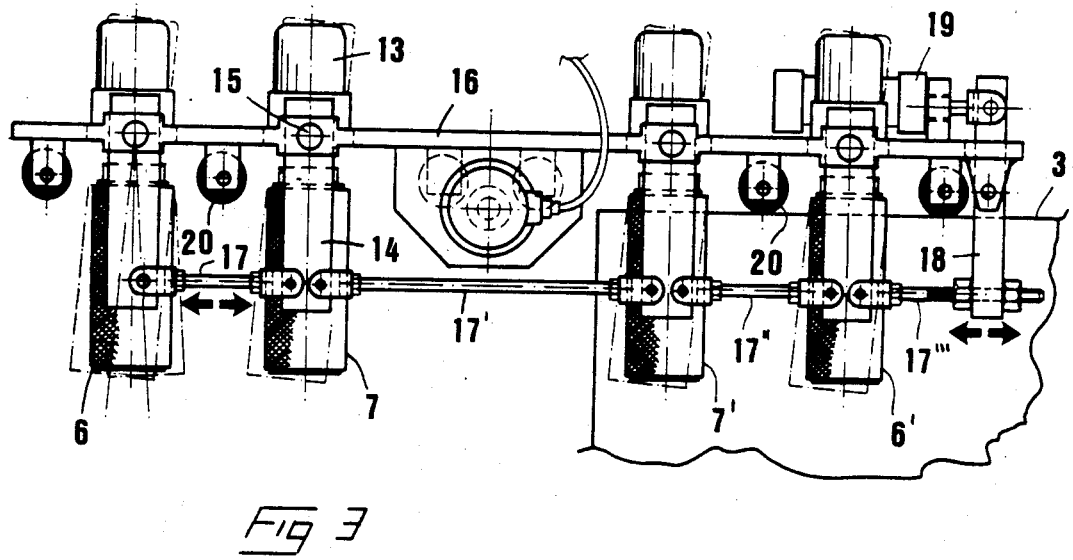
FIG. 3 is a schematic top plan view of the apparatus.

It is shown in greater detail in FIGS. 2 and 3 how the apparatus or unit according to the invention is designed. In the illustrated example, the apparatus comprises two sets of rollers, generally designated 5 and 5', each of which includes two upper rollers 6, 7 and 6', 7', respectively, and two lower rollers 8, 9 and 8', 9', respectively. The upper rollers 6, 7, 6', 7' are thus in a substantially common plane on one side of the sheet 1 to be worked, and the rollers 8, 9, 8', 9' are in a common plane which is substantially parallel to and spaced from the first-mentioned plane. As intimated in FIG. 2, the lower rollers 8–9' are suitably stationary with respect to the unit 4 whereas all the upper rollers 6–7' can be raised and lowered into different positions to suit sheets of different thickness. Although the means for raising and lowering the upper rollers have not been shown in greater detail in the drawings, it is understood that these rollers can be pressed against the sheet 1 with a suitable constant pressure which produces a frictional engagement between the rollers and the sheet. In this context, it should also be noted that the circumferential surfaces of the rollers may advantageously be knurled or otherwise shaped to increase the frictional engagement between the rollers and the sheet. Of the illustrated rollers, either all or only some of them are driven. Essential is however that at least one driven roller is provided in each of the two roller sets 5 and 5'.

In the area between the two sets of rollers 5, 5', there is provided an assembly of metal working means which in this case consist of two rotatable milling bodies 10, 10' which are mounted in attachments 11, 11' of the unit 4 and which can be driven by suitable drives, such as hydraulic motors 12, 12'. In this case, the milling bodies 10, 10' are conical so as to produce two bevelled surfaces on the edge of the sheet being milled. It goes without saying that the number and shape of the milling cutters may vary to a great extent in dependence upon the desired shape of the sheet edge. At least one milling body is vertically adjustable to different sheet thicknesses.

According to the invention, the driven roller or rollers included in the sets of rollers used are mounted at an angle or are angularly adjustable with respect to the direction of movement in order to impart to the sheet, during machining thereof, not only a longitudinal component force producing said relative movement between the sheet 1 and the unit 4, but also a transverse component force which will automatically constantly tend to urge the edge of the sheet and the milling cutters 10, 10' against each other. In FIG. 3, it is illustrated how the individual rollers, each together with a motor 13, are mounted in holders generally designated 14 which, in turn, are pivotable about pivot shafts 15 mounted in a frame 16 being part of the unit 4 and common to all the rollers. The holders 14, at their free ends remote from the pivot shafts 15, are interconnected by articulated links 17, 17', 17'', and one of the holders, in this case the one associated with the roller 6', is connected by a link 17''' to an arm 18 which is pivotal with respect to the frame by means of an operating mechanism which suitably consists of a double-acting piston and cylinder assembly 19. By means of this mechanism, the pivot arm 18 and, hence, all of the rollers 6, 7, 6', 7' can be set obliquely in relation to the sheet edge 3, i.e. to the direction of movement, at an angle which is either acute or obtuse. Although, for greater clarity, the angles of adjustment are exaggerated in FIG. 3, it is sufficient in actual practice to set the rollers at an angle of only 0.5–2, preferably about 1°, to the plane extending at right angles to the sheet edge 3 to obtain the effect aimed at, i.e. to ensure that the milling bodies 10, 10' and the edge of the sheet are constantly maintained in engagement with each other. It should be observed that the frame 16 includes a plurality of supporting wheels 20 which are succeeding upon each other rectilinearly and whose axes of rotation are perpendicular to the axes of rotation of the rollers and on which the sheet edge is bearing during the machining operation. The centre of rotation of the two milling bodies 10, 10' is situated on a line drawn between the peripheral portions of the supporting wheels 20 facing the sheet.

Although only the rollers in the upper plane are shown angularly adjustable in FIG. 3, it is understood that also the rollers 8, 9, 8', 9' in the lower plane are angularly adjustable in a similar way.

From FIGS. 2 and 3, it appears how the milling cutters 10, 10' are located at a relatively short distance from the adjacent pairs of rollers 7, 9, 7', 9' of the two roller sets 5, 5'. In this way, the milling cutters can closely follow any sinuosities that may appear in the sheet, also after one set of rollers has left the end face of the sheet. In this context, it should also be pointed out that the provision of one set of rollers on either side of the milling cutter assembly 10, 10' means that one set of rollers alone can carry the unit 4 in its entirety and follow the sheet edge even after the other set of rollers has passed the end face of the sheet.

Reference is now again had to FIG. 1 illustrating how the unit 4 movable along the sheet edge 3 is carried by a supporting device consisting of two link arm systems 21, 21' each comprising two hydraulic cylinders 22, 23 by means of which the unit 4 can be raised or lowered to the desired level and maintained in a plane common to that of the sheet 1, both before and after a machining operation. The supporting arms 21, 21', in turn, are carried on a sledge-like plate 24 which is movable along longitudinal guide bars 25, either by means only of the drive rollers of the unit 4 or in combination with drive means which are arranged independently on the supporting plate and operate synchronously with the drive rollers of the unit 4. A control desk 26 may also be mounted on the plate 24.

MODE OF OPERATION OF THE APPARATUS OF THE INVENTION

The sheet 1 is placed on the two beams 2, 2' which have previously been adjusted such that the edge portions of the sheet project a suitable distance from the beams. In connection herewith, the two metal working units 4 are in a position beside the short ends of the sheet. In an initial phase, each unit 4 is moved, by displacement of the supporting plate 24 in its entirety, to the area of the short end of the sheet, such that the pairs of rollers 6, 8 and 7, 9 are positioned on either side of the sheet. The rollers 6, 7 are then lowered and pressed against the sheet, and the associated drive motors 13 are started, such that the unit is set in motion along the sheet edge. At this time, the milling cutters 10, 10' are also started and, on entering into contact with the sheet edge, they will machine and bevel the edge in a per se known manner. As soon as the rollers of the succeeding roller set 5' pass over the end face of the sheet, the rollers 6', 7' will also be urged against the sheet, whereupon all the drive rollers of the unit will impart to it a propulsive or feed movement relative to the sheet. When the unit 4 has arrived at the opposite end face of the sheet, the roller set 5 leaves the sheet first and the succeeding set of rollers 5' continues to advance the unit relative to the sheet until also the milling cutters 10, 10' leave the end face of the sheet, whereupon the machining operation proper is terminated. Finally, the rollers 6', 7' are removed from the sheet which can then be taken away from the supporting beams 2, 2'.

It should be noted that the other metal working unit 4' can machine the edge 3' at the same time as the unit 4 is machining the edge 3 as described above, which means an efficient use of the sheet supporting table and entails a quick final machining of the sheet in its entirety.

Figure 4:
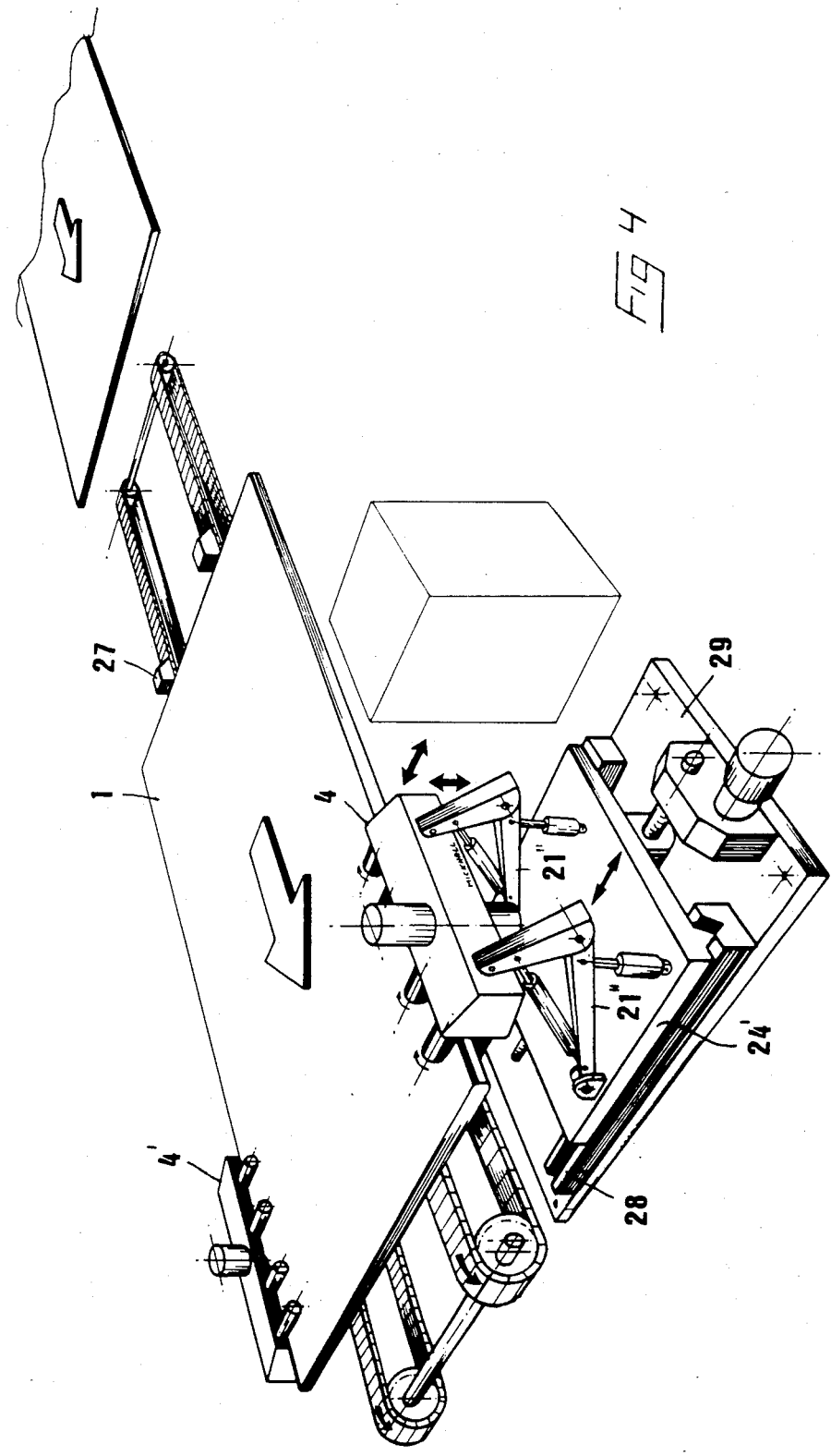
FIG. 4 is a perspective view showing an edge preparation installation according to an alternative embodiment.

FIG. 4 shows an alternative embodiment of an edge preparing installation specially designed for sheets which are smaller and thinner than those machined in the installation of FIG. 1. In this case, the metal working units 4, 4' are stationary, and the relative movement between the drive rollers of the unit and the sheet consists in that the sheet is moved with respect to the metal working units. This movement of the sheet may, if so desired, be supported by one or more drivers, for instance included in endless chains associated with the table (not shown) on which the sheet is placed. Further, in the illustrated example, the supporting plate 24' for the arms 21" supporting the unit 4 is movable in a direction perpendicular to the longitudinal extent or feed direction of the sheet 1, more specifically by guides 28 mounted on a base 29. In that the plate 24' is movable sideways, the unit 4 can be rapidly and conveniently adjusted to sheets of highly varying widths.

Figure 5:
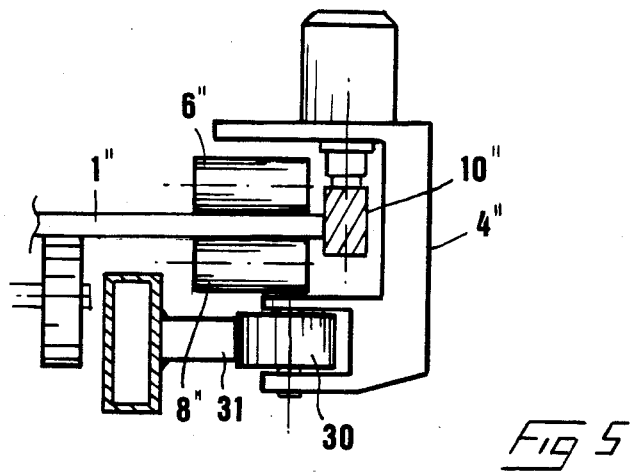
FIG. 5 is a schematic side view of an alternative embodiment of the apparatus according to the invention.

FIG. 5 shows an embodiment which is specially designed for machining sheets with uneven edge portions, so that these will have a straight or linear edge, whether it is bevelled or not. The illustrated metal working unit 4", in addition to drive rollers 6", 8" of the type described above, also contains one or more idle supporting wheels 30 which engage a rectilinear guiding rule 31 associated with the table supporting the sheet. When the unit 4" is caused, as described above, to move along the edge portion of the sheet by means of the drive rollers 6", 8", the uneven edge portions of the sheet will be milled off so as to obtain a straight edge defined by the guiding rule 31.

Figure 6:
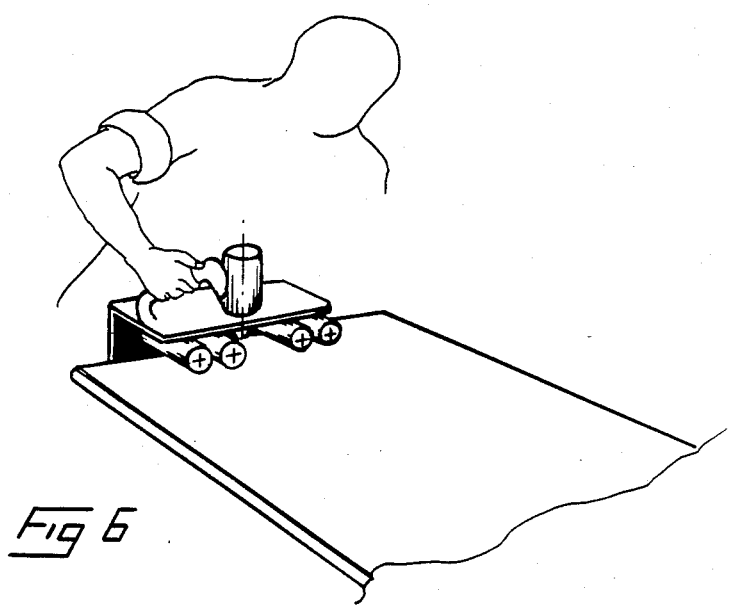
FIG. 6 is a perspective view schematically illustrating a further alternative embodiment of the apparatus.

In FIG. 6, finally, it is intimated how the apparatus described can be modified to form a hand tool. In this instance, both the milling cutters and the drive rollers can be driven by electric motors or air motors instead of hydraulic motors as shown above.

POSSIBLE MODIFICATIONS OF THE INVENTION

It goes without saying that the invention is not restricted only to the embodiments described above and shown in the drawings. Thus, it should be pointed out that the number of rollers of each set of rollers may deviate from the number of four and be any suitable number from three and above. Further, the milling cutters may be replaced by any other suitable metal working means capable of machining the sheet edge in the method described above or in any other suitable way.

In all the embodiments shown in the drawings, the direction of rotation of the drive rollers can be reversed in order to make it possible selectively to advance the metal working unit relative to the sheet in either of two opposite directions. It is however also conceivable to use rollers which can rotate in one direction only, especially when the metal working unit is stationary. Further, it should be pointed out that the supporting arms 21, 21' maintaining the metal working unit on a suitable level before and after a machining operation, are allowed during the course of the operation to hang freely or depressurized from the metal working unit, i.e. without positively guiding it. The supporting wheels 20 on which the edge of the sheet rests may advantageously be adjustably movable laterally, thus making it possible, if required, to adjust the position of the sheet edge with respect to the milling or working means.

What we claim and desire to secure by Letters Patent is:

1. Apparatus for preparing the edges of a metal sheet to be welded, said sheet having first and second main surfaces, comprising an assembly of metal working means, in particular milling cutters, being included in a unit associated with means for producing a relative movement between said sheet and said unit, during which movement said metal working means are working an edge of said sheet, characterized in that said means for producing said relative movement comprise, seen in the direction of the movement, a first set of rotatable rollers before and a second set of rotatable rollers after said metal working means, each set comprising at least three rollers which can be pressed against said main surfaces of said sheet, at least one roller of each set being disposed at the first main surface of the sheet and at least two rollers of the set being disposed at the second main surface of the sheet as well as being spaced from each other in the direction of movement in order, together with said at least one roller that is disposed at the first main surface of the sheet, to safely hold on to the sheet also when said metal working means have passed the end of the sheet edge being worked, and that at least one roller of each set of rollers is a driven roller that is positioned at an angle or angularly positionable in relation to the direction of movement and in a plane parallel to the sheet in order, during working of the sheet edge, to impart to the sheet not only a longitudinal component force bringing about said relative movement between the sheet and said unit, but also a transverse component force that urges the edge of the sheet and said metal working means against each other.

2. Apparatus as claimed in claim 1, characterised in that the direction of rotation of the driven rollers is reversible in order to permit moving said unit with respect to the sheet in either of two opposite directions.

3. Apparatus as claimed in claim 1, characterised in that all rollers which are located in a common plane for engaging one main surface of the sheet are pivotally connected to a common frame by means of pivot shafts oriented at substantially right angles to the axes of rotation of the rollers, said rollers being pivotal between positions in which their axes of rotation make either an acute or an obtuse angle with the direction of movement of the unit.

4. Apparatus as claimed in claim 3, characterised in that each driven roller is mounted, together with a motor therefor, in a holder which in turn is pivotable about said pivot shaft, all of said holders for the rollers positioned in a common plane being interconnected by articulated links spaced apart from and extending substantially parallel to a row of pivot shafts, and that one holder is connected to a pivot arm mounted on the frame and suitably operated by a hydraulic cylinder for pivoting the rollers to different positions of adjustment.

5. Apparatus as claimed in claim 1, characterised in that a plurality of supporting wheels disposed along an imaginary straight line cooperate with the rollers and have their axes of rotation perpendicular to the axes of rotation of the rollers, said metal working means being located along said line.

6. Apparatus as claimed in claim 1, characterised in that the unit is supported by a supporting device for holding the unit in a ready position.

7. Apparatus as claimed in claim 6, characterised in that the supporting device is movable together with the unit along a stationary sheet.

8. Apparatus as claimed in claim 6, characterised in that the supporting device comprises a link arm system.

9. Apparatus as claimed in claim 1, wherein the apparatus is configured as a manually operable hand tool that is movable along a stationary sheet.

* * * * *